Jan. 14, 1936.  W. STOECKICHT  2,027,655

PLANET GEARING

Filed June 4, 1932

Inventor:
Wilhelm Stoeckicht
By *[signature]*
Attorney.

UNITED STATES PATENT OFFICE 2,027,655

PLANET GEARING

Wilhelm Stoeckicht, Munich-Solln, Germany

Application June 4, 1932, Serial No. 615,419
In Germany June 23, 1931

9 Claims. (Cl. 74—305)

Pinion-wheel planet-gearing is known and the present invention has for its object to provide an improved gearing of this character. It resides in that in which an equalization of the pressures on the teeth is automatically obtained, i. e. a uniform distribution of load on the planet wheels and an equalization of the errors in distribution occurring in the gearing. This problem has hitherto been solved completely only in the case of planet gearing comprising bevel gear wheels but not in the case of such gearing with pinion wheels.

Figure 1:
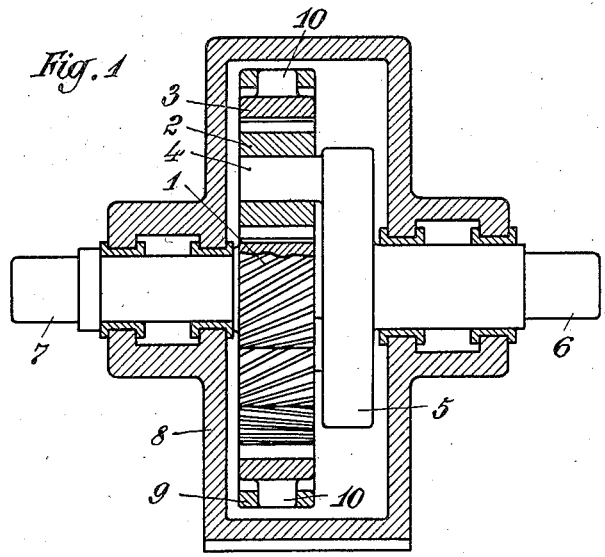

One embodiment of the invention is shown by way of example in the accompanying drawing in which:

Fig. 1 is a longitudinal section and

Figure 2:
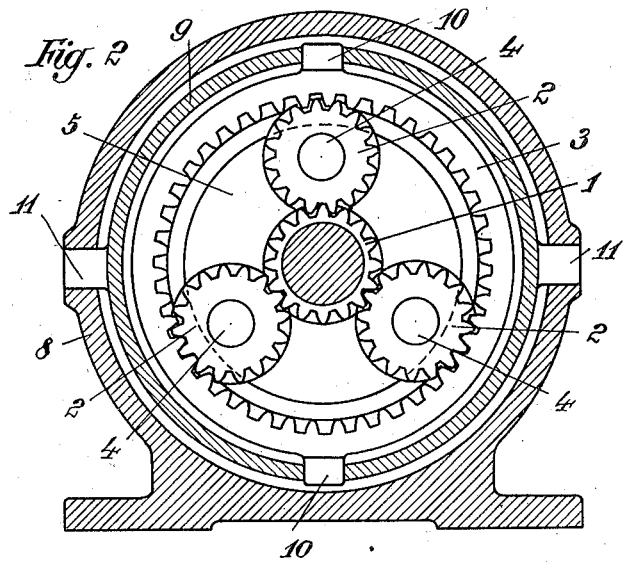

Fig. 2 a cross section through a planet gearing with oblique tooth pinion wheels.

The planet wheels 2 are arranged about the small sun-wheel 1 and in turn are embraced by the large gear or gear ring 3. The planet wheels 2 run on pins 4 which are mounted on the support 5 for the rotating wheels, the support 5 being connected to the shaft 6. The small sun-wheel 1 is connected with the shaft 7. The large gear or gear ring 3 is suspended Cardanically in the housing 8 by means of a ring 9 and the pair of pins 10 and 11, in order that it can perform a pendulous motion about the mid-point of the gear wheel system. The gear or gear ring 3 is stationary and the planet-wheels 2 roll thereon.

The mode of operation is as follows:

Due to the oblique toothing of the gear wheels, axial forces arise in the transmission of power through the gearing. In the case of the planet wheels 2 these axial forces operate as pairs of forces which are taken up at any time by the pins 4. In the case of the sun-wheel 1 the axial forces are taken up by the bearing of the shaft 7 and in the case of the gear 3 they are taken up by the housing 8. Now as in consequence of its mode of suspension, the gear 3 performing a pendulous motion about the centre of the gearing system, it will always so adjust itself that the axial forces operating on it are in equilibrium. Now as these axial forces are occasioned by the pressure on the teeth and are in a fixed relationship thereto an equilibrium of the tooth pressures also positively follows from the equilibrium of the axial pressures and this is the same as a constantly uniform distribution of load on the rotating wheels. Thus the effect of any distribution errors in the gearing, whether in the gear wheels or in the support of the rotating wheels, is automatically balanced.

Preferably the Cardanic suspension of the gear 3 in the pins 10 and 11 is given a little radial play so that the gear 3 can adjust itself automatically to the centre of the gearing.

In the pendulous motion of the gear 3 from its central position, the amount by which its teeth engage in the planet wheels 2 will be altered somewhat. However the magnitude of the distribution errors which are to be balanced is small and thus the angle of the pendulous motion is also small, the variation in the depth of engagement of the teeth also being very slight and can readily be maintained within the permissible amount.

The possibility of executing a pendulous motion can be carried out also by the sun-wheel instead of by the orbit wheel.

The advantage afforded by the present invention resides in that the uniform distribution of load on the planet wheels leads on the one hand to very smooth running of the gearing and on the other hand to small specific loads on the teeth so that it is possible to construct this gearing to be very small and consequently to be cheap even when used for transmitting a large drive.

I claim:

1. Planet gearing comprising planet wheels with oblique teeth, an orbit wheel with corresponding teeth, and means supporting said orbit wheel in such manner as to enable it to perform a pendulous motion.

2. Planet gearing comprising planet wheels with oblique teeth and a corresponding orbit wheel carried by means enabling it to perform a pendulous motion about the centre of the gearing system.

3. Planet gearing comprising planet wheels with oblique teeth, an orbit wheel with corresponding teeth, and a Cardanic suspension for said orbit wheel enabling it to perform a pendulous motion about the centre of the gearing system.

4. Planet gearing comprising planet wheels with oblique teeth, an orbit wheel with corresponding teeth, a Cardanic suspension for said orbit wheel and bearings for the pins of said suspension affording play in the radial direction of the toothed wheels.

5. Planet gearing comprising planet wheels with oblique teeth, a central sun-wheel with corresponding external teeth, a gear ring with corresponding internal teeth, and means supporting said gear ring enabling it to perform a pendulous motion.

6. Planet gearing comprising planet wheels with oblique teeth, a central sun-wheel with corresponding external teeth, a gear ring with corresponding internal teeth, and means supporting said gear ring enabling it to perform a pendulous motion about the centre of the gearing system.

7. Planet gearing comprising planet wheels with oblique teeth, a central sun-wheel with corresponding external teeth, a gear ring with corresponding internal teeth, and a Cardanic suspension for said gear ring.

8. Planet gearing comprising planet wheels with oblique teeth, a central sun-wheel with corresponding external teeth, a gear ring with corresponding internal teeth, a Cardanic suspension for said gear ring and bearings for the pins of said suspension affording play in the radial direction of the toothed wheels.

9. Planet gearing comprising a housing, a driving and a driven shaft having a coinciding axis, planet wheels having oblique teeth, a sun-wheel provided on one of said shafts and meshing with said planet wheels, a wheel having teeth corresponding with said oblique teeth, and means for Cardanically suspending said last mentioned wheel from the housing so that a pendulous movement takes place around a point which lies in the axis.

WILHELM STOECKICHT.